United States Patent
Haagens et al.

(10) Patent No.: US 8,150,996 B2
(45) Date of Patent: Apr. 3, 2012

(54) METHOD AND APPARATUS FOR HANDLING FLOW CONTROL FOR A DATA TRANSFER

(75) Inventors: Randy Haagens, Roseville, CA (US); Mallikarjun Chadalapaka, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2301 days.

(21) Appl. No.: 10/737,207

(22) Filed: Dec. 16, 2003

(65) Prior Publication Data

US 2005/0131986 A1    Jun. 16, 2005

(51) Int. Cl.
G06F 15/16 (2006.01)

(52) U.S. Cl. .................................... 709/237

(58) Field of Classification Search .......... 709/201, 709/220, 237; 370/466–467
See application file for complete search history.

(56) References Cited

U.S. PATENT DOCUMENTS

| | | | |
|---|---|---|---|
| 5,325,532 A | 6/1994 | Crosswy et al. |
| 5,675,807 A | 10/1997 | Iswandhi et al. |
| 5,737,604 A | 4/1998 | Miller et al. |
| 5,751,932 A | 5/1998 | Horst et al. |
| 5,809,285 A | 9/1998 | Hilland |
| 5,815,707 A | 9/1998 | Krause et al. |
| 5,822,571 A | 10/1998 | Goodrum et al. |
| 5,870,568 A | 2/1999 | Culley et al. |
| 5,872,941 A | 2/1999 | Goodrum et al. |
| 5,914,953 A | 6/1999 | Krause et al. |
| 5,948,111 A | 9/1999 | Taylor et al. |
| 5,964,835 A | 10/1999 | Fowler et al. |
| 5,978,858 A | 11/1999 | Bonola et al. |
| 5,983,269 A | 11/1999 | Mattson et al. |
| 6,018,620 A | 1/2000 | Culley et al. |
| 6,038,621 A | 3/2000 | Gale et al. |
| 6,047,323 A | 4/2000 | Krause |
| 6,070,198 A | 5/2000 | Krause et al. |
| 6,070,253 A | 5/2000 | Tavallaei et al. |
| 6,157,967 A | 12/2000 | Horst et al. |
| 6,163,834 A | 12/2000 | Garcia et al. |

(Continued)

FOREIGN PATENT DOCUMENTS

WO   WO 00/72142 A1 * 11/2000

OTHER PUBLICATIONS

Long, James. "Overview of Modern SCSI Networking Protocols," http://www.ciscopress.com/articles/printerfriendly.asp?p=484553&rl=1, Aug. 4, 2006, Cisco Press.*

(Continued)

*Primary Examiner* — John Follansbee
*Assistant Examiner* — Maceeh Anwari

(57) ABSTRACT

The disclosed embodiments relate to an apparatus and method for managing flow control of a data transfer. An apparatus according to embodiments of the present invention may comprise a first protocol associated with a plurality of receive buffers, a second protocol adapted to manage the plurality of receive buffers for the first protocol, and a third protocol that determines whether one of the plurality of receive buffers is available for a data packet and (a) if one of the plurality of receive buffers is available, permits an acknowledgement packet to be sent to a node that sent the data packet, and (b) if one of the plurality of receive buffers is unavailable, drops the data packet, notifies the second protocol regarding the unavailability of the plurality of receive buffers, and withholds the acknowledgement packet.

26 Claims, 4 Drawing Sheets

U.S. PATENT DOCUMENTS

| | | | |
|---|---|---|---|
| 6,233,702 | B1 | 5/2001 | Horst et al. |
| 6,289,023 | B1 | 9/2001 | Dowling et al. |
| 6,484,208 | B1 | 11/2002 | Hilland |
| 6,493,343 | B1 | 12/2002 | Garcia et al. |
| 6,496,940 | B1 | 12/2002 | Horst et al. |
| 6,502,203 | B2 | 12/2002 | Barron et al. |
| 2004/0190533 | A1* | 9/2004 | Modi et al. ............. 370/400 |

OTHER PUBLICATIONS

U.S. Appl. No. 10/400,313, filed Mar. 27, 2003, entitled Protection Domain Groups, Inventor: Jeffrey R. Hilland et al.

U.S. Appl. No. 10/401,234, filed Mar. 27, 2003, entitled Queue Pair/Window Association, Inventor: David J. Garcia et al.

U.S. Appl. No. 10/401,232, filed Mar. 27, 2003, entitled Physical Mode Addressing, Inventor: Kathryn Hampton et al.

U.S. Appl. No. 10/401,230, filed Mar. 27, 2003, entitled Physical Mode Windows, Inventor: David J. Garcia et al.

U.S. Appl. No. 10/401,237, filed Mar. 27, 2003, entitled Method and Apparatus for Performing Connection Management with Multiple Stacks, Inventor: Prashant Modi et al.

U.S. Appl. No. 10/401,233, filed Mar. 27, 2003, entitled Atomic Operations, Inventor: Dwight L. Barron et al.

U.S. Appl. No. 10/401,236, filed Mar. 27, 2003, entitled Signal Packet, Inventor: Dwight L. Barron.

U.S. Appl. No. 10/401,231, filed Mar. 27, 2003, entitled Shared Receive Queues, Inventor: Mallikarjun Chadalapaka et al.

U.S. Appl. No. 10/401,235, filed Mar. 27, 2003, entitled Binding a Memory Window to a Queue Pair, Inventor: David J. Garcia et al.

U.S. Appl. No. 10/641,127, filed Aug. 14, 2003, entitled Method and Apparatus for Accessing a Memory, Inventor: Mallikarjan Chadalapaka.

U.S. Appl. No. 10/641,129, filed Aug. 14, 2003, entitled Method and Apparatus for Implementing Work Request Lists, Inventors: Jeffrey R. Hilland et a l.

Jeffrey R. Hilland et al., "RDMA Protocol Verbs Specification (Version 1.0)" (Apr. 2003).

U.S. Appl. No. 10/666,174, filed Sep. 18, 2003, entitled Method and Apparatus for Acknowledging a Request for Data Transfer, Inventor: Mallikarjan Chadalapaka.

U.S. Appl. No. 10/664,707, filed Sep. 18, 2003, entitled Method and Apparatus for Providing Notification, Inventor: Michael R. Krause, et al.

* cited by examiner

METHOD AND APPARATUS FOR HANDLING FLOW CONTROL FOR A DATA TRANSFER

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the field of computer systems, it may be desirable for information to be transferred from a system memory associated with one computer system to a system memory associated with another computer system. The information may be transmitted by upper layer protocols (ULPs), which may be referred to as processes, through a network that connects the computer systems. These ULPs may utilize other protocols to perform the actual data exchange between the computer systems. In addition, the ULPs may utilize other protocols to manage the flow of data between the computer systems.

Some ULPs may operate in this environment without problems because ULPs precisely estimate the memory demands to satisfy the data transfer needs or control the amount of data to not overrun available memory at the receiver. These ULPs implement precise flow control for messages that are communicated with other ULPs. As such, when communicating with peer ULPs via other protocols to receive the inbound data transfers, a ULP may guarantee receive buffer availability because the memory demands are known and deterministic. In such an environment, if a data packet is received and no receive buffer is available, the ULP and protocols utilized by ULP for the data transfer may assume that an error has occurred. The ULP or protocols may then terminate the connection between the ULPs, which may result in a loss of data or commands that are being exchanged.

However, for other ULPs and protocols with imprecise flow control, the termination of the connection between the ULPs, is not an acceptable approach. For instance, if the ULP utilizes a protocol to manage the data transfer, such as an internet small computer systems interface ("iSCSI") protocol, it may have limited flow control capabilities. The protocol may not manage various types of commands because it has a limited flow control. As a result, other protocols assisting the iSCSI protocol in the data transfer, such as a datamover protocol, may be utilized to enforce stricter forms of send message flow control to deterministically manage the flow control within the data exchange. The stricter send message flow control may increase the complexity of the system, and lead to drawbacks in scalability.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Remote Direct Memory Access ("RDMA") Consortium, which includes the assignee of the present invention, is developing specifications to improve the ability of systems to remotely access the memory of other systems. One such specification under development is the RDMA Protocol Verbs Specification, which is hereby incorporated by reference. The verbs defined by this specification may correspond to commands or actions that may form a command interface for data transfers between memories in systems.

RDMA may refer to the ability of one system to directly place information in or receive information from the memory space of another "target" system, while minimizing demands on the central processing unit ("CPU") and memory bus of the target system. The systems may be computer systems, storage controllers, appliances, routers, layer 4 switches, I/O modules, or the like. In an RDMA system, an RDMA layer or protocol may interoperate over any physical or wireless layer in a Local Area Network ("LAN"), Server or Storage Area Network ("SAN"), Metropolitan Area Network ("MAN"), Wide Area Network ("WAN"), backplane, bus, or the like.

Figure 1:
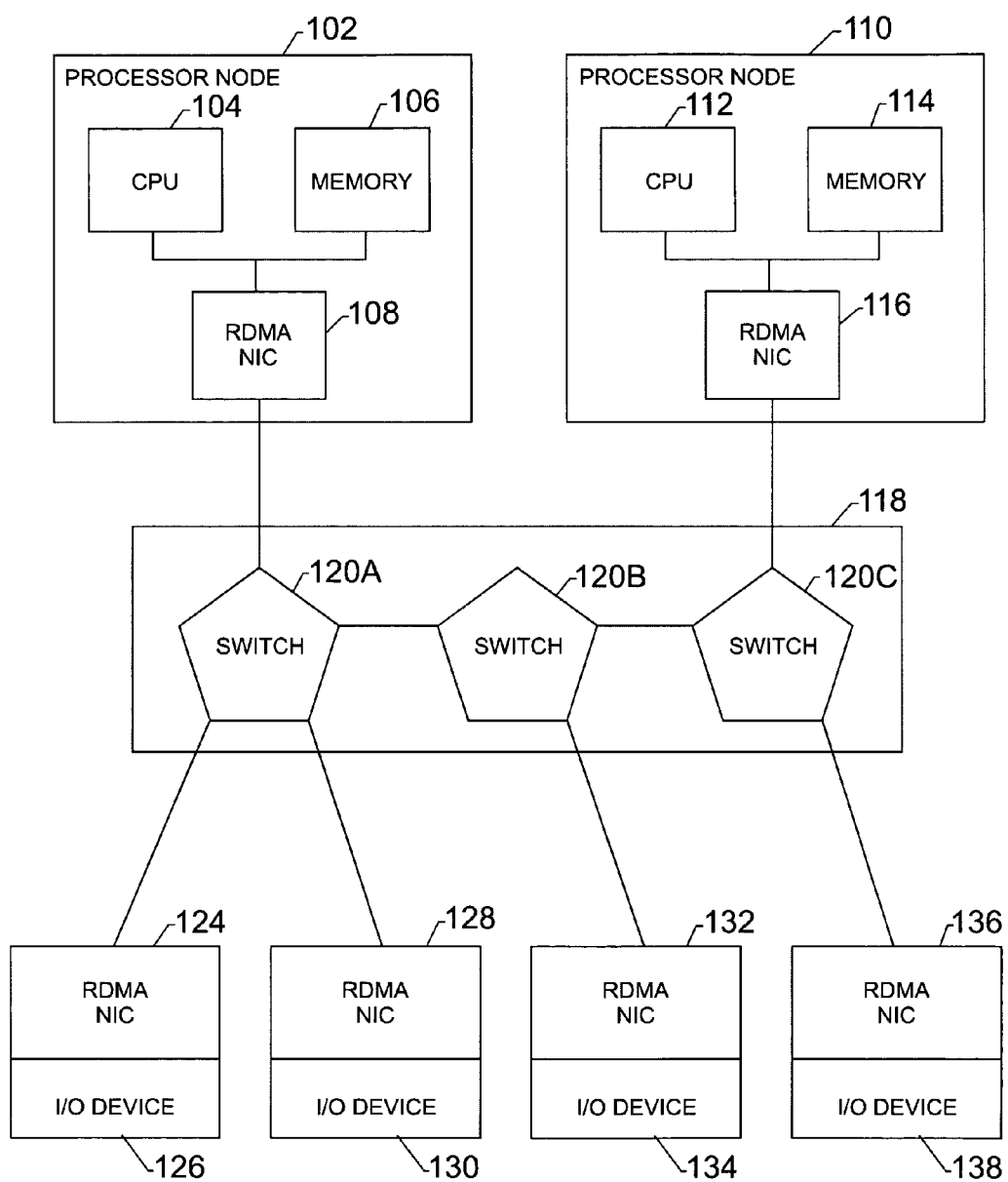
FIG. 1 is a block diagram illustrating a computer network in which embodiments of the present invention may be employed.

Referring now to FIG. 1, a block diagram illustrating a network in accordance with embodiments of the present invention is illustrated. The network is indicated by the reference numeral 100 and may comprise a first processor node 102 and a second processor node 110, which may be connected to a plurality of input/output ("I/O") devices 126, 130, 134, and 138 via a switch network 118. Each of the I/O devices 126, 130, 134 and 138 may utilize a Remote Direct Memory Access-enabled Network Interface Card ("RNIC") to communicate with the other systems. In FIG. 1, the RNICs associated with the I/O devices 126, 130, 134 and 138 are identified by the reference numerals 124, 128, 132 and 136, respectively. The I/O devices 126, 130, 134, and 138 may access the memory space of other RDMA-enabled devices via their respective RNICs and the switch network 118.

The topology of the network 100 is for purposes of illustration only. Those of ordinary skill in the art will appreciate that the topology of the network 100 may take on a variety of forms based on a wide range of design considerations. Additionally, NICs that operate according to other protocols, such as InfiniBand, Quadrics, or Myrinet, may be employed in networks that employ such protocols for data transfer.

The first processor node 102 may include a CPU 104, a memory 106, and an RNIC 108. Although only one CPU 104 is illustrated in the processor node 102, those of ordinary skill in the art will appreciate that multiple CPUs may be included therein. Also, the CPU 104 may be a processing element, state machine, or the like. The CPU 104 may be connected to the memory 106 and the RNIC 108 over an internal bus or other form of connection. The memory 106 may be utilized to store information for use by the CPU 104, the RNIC 108 or other systems or devices. The memory 106, which may alternatively be integrated into the CPU 104, may include memory controllers and various types of memory, such as Static Random Access Memory ("SRAM") or Dynamic Random Access Memory ("DRAM").

The second processor node 110 may include a CPU 112, a memory 114, and an RNIC 116. Although only one CPU 112 is illustrated in the processor node 110, those of ordinary skill in the art will appreciate that multiple CPUs may be included therein. The CPU 112, which may include a plurality of processors, may be connected to the memory 114 and the RNIC 116 over an internal bus or connection. The memory 114 may be utilized to store information for use by the CPU 112, the RNIC 116 or other systems or devices. The memory 114 may utilize various types of memory such as SRAM or DRAM.

The switch network 118 may include any combination of hubs, switches, routers, point-to-point links, and the like. In FIG. 1, the switch network 118 comprises switches 120A-120C. The switch 120A connects to the switch 120B, the RNIC 108 of the first processor node 102, the RNIC 124 of the I/O device 126 and the RNIC 128 of the I/O device 130. The I/O devices may be any variant from a traditional I/O device to a bridge, route or other translation device or even loopback. In addition to its connection to the switch 120A, the switch 120B connects to the switch 120C and the RNIC 132 of the I/O device 134. In addition to its connection to the switch 120B, the switch 120C connects to the RNIC 116 of the second processor node 110 and the RNIC 136 of the I/O device 138.

Each of the processor nodes 102 and 110 and the I/O devices 126, 130, 134, and 138 may be given access to the memory 106 or 114. As such, the memories 106 and 114 may be accessible by remote devices, such as the I/O devices 126, 130, 134 and 138 via the switch network 118 through the use of a protocol stack. The first processor node 102, the second processor node 110 and the I/O devices 126, 130, 134 and 138 may exchange information using protocol stacks. The protocol stack is further explained in FIG. 2.

Figure 2:
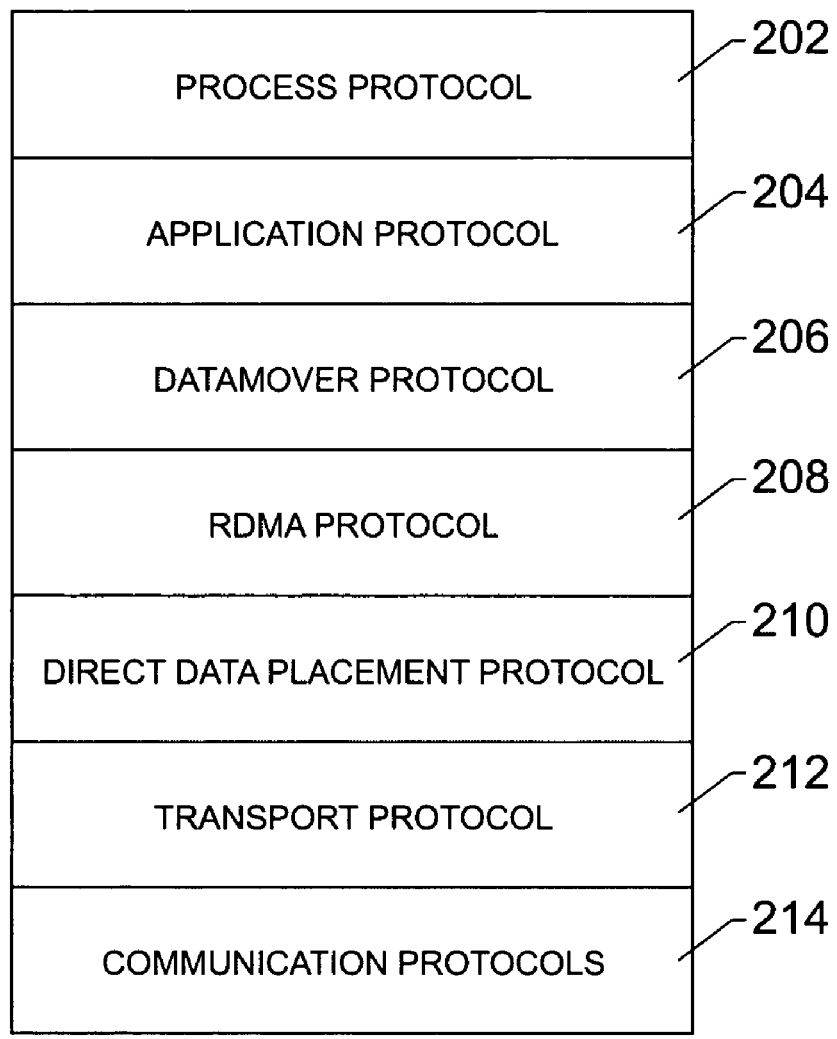
FIG. 2 is a block diagram illustrating a protocol stack in accordance with one embodiment of the present invention.

FIG. 2 is a block diagram illustrating a protocol stack in accordance with an embodiment of the present invention. The RNICs 108, 116, 124, 128, 132 and 136 (FIG. 1) may be adapted to exchange information using a protocol stack 200. The protocol stack 200 may include a variety of protocols that are utilized by a process or application to perform certain functions.

In FIG. 2, a process protocol 202, which may comprise a process, an upper layer protocol, or an application, may interact with the protocol stack to communicate with other devices or within the node. The process protocol 202 may interact with a process protocol in another system to exchange data. For instance, the process protocol 202 may comprise an intelligent peripheral I/O interface, such as a small computer systems interface ("SCSI") protocol, which allows many different peripheral devices to communicate with other components of the system. The process protocol 202 may interact with an application protocol 204, which may be an Internet SCSI ("iSCSI") protocol.

The application protocol 204 may interact with a protocol or a group of protocols that are referred to as the datamover or datamover layer or datamover protocol 206, which may be an instance of the iSCSI Extensions for RDMA ("iSER") protocol. The datamover protocol 206 may offload the tasks of data movement and placement from the application protocol 204. The datamover protocol 206 may communicate with a suite of protocols that may include an RDMA protocol 208, a direct data placement ("DDP") protocol 210, and/or a marker with protocol data unit alignment ("MPA") protocol (not shown). These protocols may be referred to as iWARP protocols, which may be a suite of protocols that includes the RDMA protocol 208, the DDP protocol 210, and/or the MPA protocol. By utilizing the iWARP protocols, the datamover protocol 206 may achieve a true zero copy of data behavior through the use of RNICs between systems. A true zero copy of data behavior is a mechanism for a data exchange with packets being sufficiently self-describing that RNICs may place the data directly in a specified receive location at another node. As a result, with true zero copy behavior, the copying of data in memory may not be utilized in the data exchange. The RDMA protocol 208 interacts with the datamover protocol 206 to exchange data without interrupting the system processor on the initiator system. The RDMA protocol 208 communicates with the DDP protocol 210 to translate messages from the RDMA protocol 208 for transmission across a network, such as switch network 118 (FIG. 1).

The iWARP protocols may interact with communication protocols to communicate over a network. The communication protocols may include a transport protocol 212, which may be utilized to interact with the DDP protocol 210, the MPA protocol, or the like. The transport protocol 212 may be a reliable transport protocol, such as transmission control protocol ("TCP") or other similar reliability based protocol. The transport protocol 212 may provide flow and congestion control by tracking the acknowledgements of data transmitted from one computer system to another computer system. To provide this reliability, the transmission protocol 212 may utilize sequence numbers and acknowledgement numbers to inform the transmission protocols at each of the computer systems of the data packets transmitted and received, which is further discussed below. The transport protocol 212 may provide the data packet to communication protocols 214 to route the packet to the other system. The communication protocols 214 may include Internet protocol ("IP"), AppleTalk, DECnet, or other similar routing protocols utilized to communicate over a network, such as network 118 (FIG. 1). The communication protocols 214 may vary depending on the specific network being utilized between the systems.

The protocol stack 200 may be utilized to efficiently manage the buffers and the data transfers between systems. For instance, if the application protocol 204 is an inter-process communication ("IPC") protocol, then the application protocol 204 may post enough receive buffers because it may precisely control the specific memory demands from other systems. However, the flow control and management of the buffers may be a problem for some applications because the protocols do not provide adequate flow control. For instance, if the application protocol 204 is an iSCSI protocol, then the application protocol 204 does not provide a positive flow control to handle the memory demands, unlike the IPC protocol. The iSCSI protocol has a relatively loose form of flow control that deals precisely with regular commands and responses, while several other types of commands carried in RDMA untagged messages, such as immediate commands, asynchronous messages, unsolicited data for write commands, and the like, are not managed by the flow control of the iSCSI protocol. As a result, the receive buffers are utilized by the untagged messages. Accordingly, when the receive buffers are consumed by these unmanaged messages, the RDMA protocol 208 and DDP protocol 210 may perceive the resulting lack of receive buffers as an error. As a result, the RDMA protocol 208 and DDP protocol 210 may tear down the connection established with the other system because of the lack of receive buffers is an irrecoverable error.

To prevent the dropping of the established connection, the datamover protocol 206, which may be an iSER protocol, may enforce a precise form of send message flow control to realize the positive flow control generally expected in the iWARP architecture of the RDMA protocol 208 and DDP protocol 210. This positive send message flow control may prevent the connection from being dropped which may cause the termination of several active commands on the connection. However, a positive send message flow control in the datamover protocol 206 limits scalability, reduces the speed of data transfers, and increases the complexity of the protocol. As such, it may be beneficial to provide a flow control mechanism that utilizes the transport protocol 212 to provide flow control for the protocol stack 200. The operation of the protocol stack 200 is further explained with respect to FIG. 3.

Figure 3:
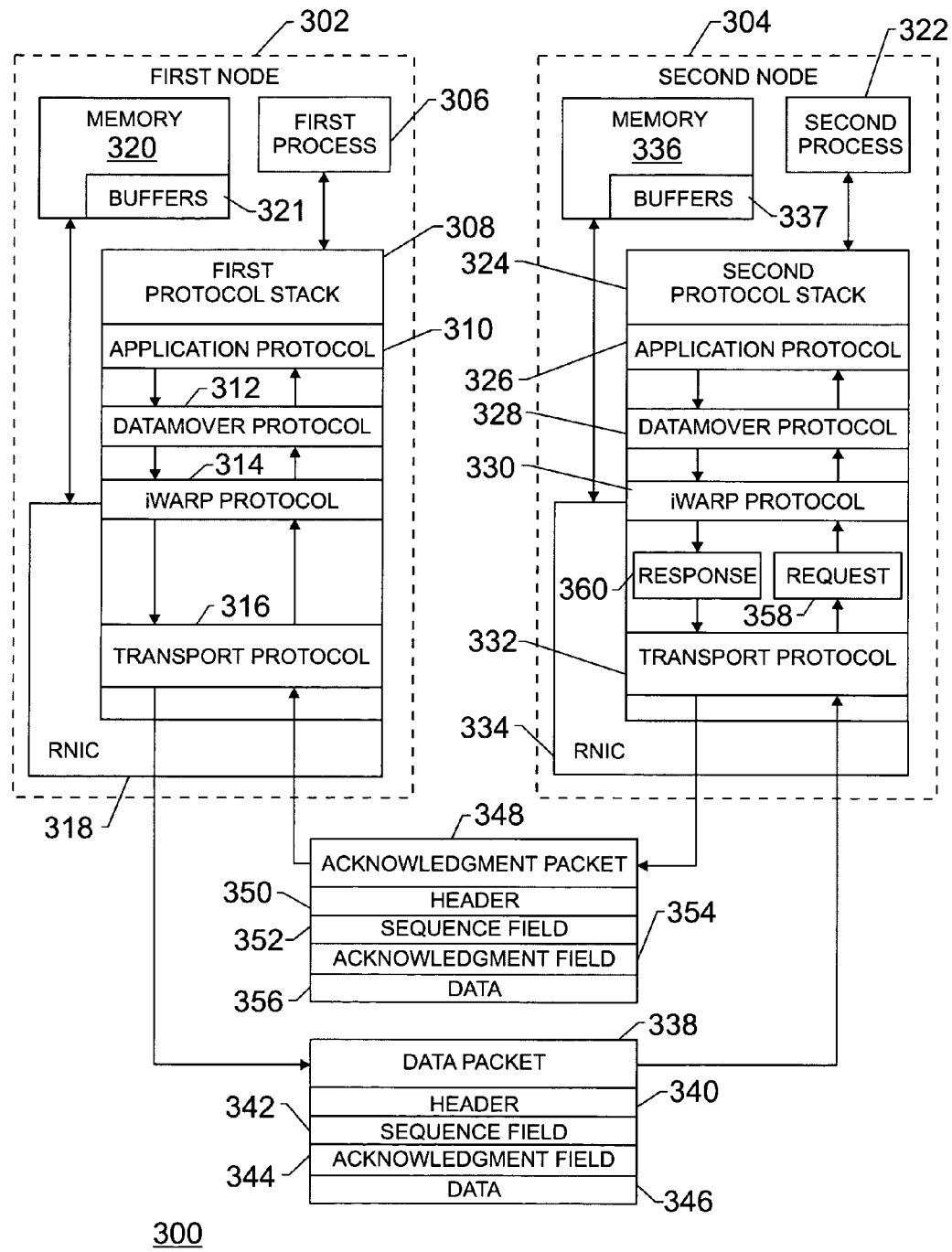
FIG. 3 is a block diagram illustrating the use of a protocol stack to exchange data between nodes in accordance with one embodiment of the present invention.

FIG. 3 is a block diagram that illustrates the use of a protocol stack, such as protocol stack 200 (FIG. 2), to exchange data between systems in accordance with embodiments of the present invention. The figure is generally referred to by the reference number 300. In FIG. 3, a first node 302 and a second node 304 may exchange information through the use of the protocol stacks, such as a first protocol stack 308 and a second protocol stack 324. The first node 302 and the second node 304 may correspond to any two of the first processor node 102, the second processor node 110, and/or the I/O devices 126, 130, 134 and 138 (FIG. 1). As set forth above with respect to FIG. 1, any of the nodes 302 and 304 may exchange information in an RDMA environment.

The first node 302 includes a first process 306, such as the process protocol 202 (FIG. 2), which interacts with an RNIC 318 and a memory 320. The first process 306 may comprise software, firmware, a silicon process or the like that may interact with various components of the RNIC 318 through the first protocol stack 308. The first protocol stack 308 may include an application protocol 310, which may comprise the application protocol 204 (FIG. 2), a datamover protocol 312, which may comprise the datamover protocol 206 (FIG. 2), iWARP protocols 314, which may include the RDMA protocol 208 and the DDP protocol 210 (FIG. 2), and a transport protocol 316, which may correspond to the transport protocol 212 (FIG. 2). The first protocol stack 308 may communicate with the RNIC 318, which may correspond to one of the RNICs 108, 116, 124, 128, 132 or 136 (FIG. 1), depending on which of the devices associated with those RNICs is participating in the data transfer. The RNIC 318 may comprise various other buffers and components, such as a send queue, a receive queue, a completion queue, a memory translation and protection table, a memory, and/or a QP context, which are not shown.

The second node includes a second process 322, such as the process protocol 202 (FIG. 2), which interacts with an RNIC 334 and a memory 336. The second process 322 may comprise software, firmware, a silicon process, or the like that may interact with various components of the RNIC 334 through a second protocol stack 324. The second protocol stack 324 may include an application protocol 326, which may correspond to the application protocol 204 (FIG. 2), a datamover protocol 328, which may correspond to the datamover protocol 206 (FIG. 2), iWARP protocols 330, which may include the RDMA protocol 208 and the DDP protocol 210 (FIG. 2), and a transport protocol 332, which may include the transport protocol 212 (FIG. 2). The second protocol stack 324 may communicate with the RNIC 334, which may correspond to the one of the RNICs 108, 116, 124, 128, 132 or 136 (FIG. 1), depending on which device is participating in the data transfer. The RNIC 334 may comprise various other buffers and components, such as a send queue, a receive queue, a completion queue, a memory translation and protection table, a memory, and/or a QP context, which are not shown.

Portions of the memories 320 and 336 may be registered to different processes, each of which may correspond to the processes 306 and 322. The memories 320 and 336 may comprise a portion of the main memory of the nodes 302 and 304, memory within the RNICs 318 and 334, or other memory associated with the nodes 302 and 304. The memory 320 may include buffers 321, while the memory 336 may include buffers 337. The buffers 321 and 337 may be allocated portions of the respective memories 320 and 336, which are allocated to the respective processes 306 and 322. The buffers 321 and 337 may be utilized to store data or other information for the processes 306 and 322, such as incoming data from other nodes, for example.

The protocol stacks 308 and 324 may be utilized by the processes 306 and 322 to communicate between the nodes 302 and 304. For instance, the application protocols 310 and 326 may be utilized to efficiently manage the respective buffers 321 and 337 associated with the processes 306 and 320. Those skilled in the art will appreciate that buffers 321 and 337 may be associated with processes 306 and 322 for storage of data, such as incoming data packets. The datamover protocols 312 and 328, the iWARP protocols 314 and 330, and the transport protocols 316 and 332 may be utilized in the communication of data between the nodes 302 and 304, as indicated by the arrows relating to the dataflow between the RNICs 318 and 334. In addition, the transport protocols 316 and 332 may also be utilized to provide flow control in the transfer of data between the nodes 302 and 304.

To initiate a data exchange between the processes 306 and 322 through the RNICs 318 and 334 and the associated protocol stacks 308 and 324, the protocols 310-316 and 326-332 in the protocol stacks 308 and 324 may communicate with each other to establish a communication path between the nodes 302 and 304. Accordingly, the protocols 310-316 and 326-332 may exchange data or requests within the protocol stacks 308 and 324, with the processes 306 and 322, or with the other protocol stack 308 or 324. For communications between the nodes 302 and 304, the transport protocols 316 and 332 may be utilized to provide flow control in the exchange of packets, such as a data packet 338 and an acknowledgement packet 348.

The data packet 338 and the acknowledgement packet 348 may include various fields of information that are utilized to manage the exchange of data between the nodes 302 and 304. For instance, the data packet 338 may include a header 340, a sequence field 342, an acknowledgment field 344, and data 346. The header 340 may be utilized to provide information about the source of the data packet 338 along with the intended destination of the data packet 338 with regard to the communication protocols (not shown). The sequence field 342 may be a value that is utilized to provide tracking for the specific data packet 338 being transmitted. This value may be a unique value that is associated with specific data. The acknowledgement field 344 may be a value that is utilized to indicate the last part of the data that was received by the other node. The data 346 may be the information that is being transferred between the nodes 302 and 304. The data 346 may include information from the other protocols 310-314 and 326-330 along with data from the processes 306 and 322 or memories 320 and 336. Similar to the data packet 338, the acknowledgement packet 348 may include a header 350, a sequence field 352, an acknowledgement field 354 and data 356. These fields 350-356 may be similar to the header 340, the sequence field 342, the acknowledgment field 344, and data 346 of the data packet 338, which is discussed above.

The fields 340-346 and 350-356 may be utilized to provide flow control and congestion control between the nodes 302 and 304. For example, if the transport protocols 316 and 332 are TCP layers, then the transport protocols 316 and 332 may track the acknowledgements for every packet because TCP is a reliable transport protocol. To provide this tracking, the data packet 338 includes the sequence field 342 that is unique to the data 346 in the data packet 338 along with the acknowledgment field 344 that indicates the last data 346 received by the first node 302, which is the initiator node. Once the data packet 338 is received at the second node 304, which is the target node, the transport protocol 332 transmits the acknowledgement packet 348 to the initiator node. The acknowledgement packet 348 includes the acknowledgement field 354, which indicates that the data packet 338 with the sequence field 342 was received by the target node. Accordingly, upon receipt of the acknowledgement packet 348, the transport protocol 316 is able to determine that the acknowledgement field 354 relates to the sequence field 342 of the data packet 338. As such, the transport protocol 316 may notify the other protocols 310-314 that the data packet 338 has been received by the target node.

Because of the reliability of the transport protocol 316 and 332, the protocol stacks 308 and 324 may utilize the transport protocols 316 and 332 to efficiently manage the flow control between the nodes 302 and 304. This may provide the protocol stacks 308 and 324 with a flow control mechanism that does not drop the connection between nodes 302 and 304 when no receive buffers are available or rely on the datamover protocols 312 and 328 for flow control. For instance, instead of sending the acknowledgement packet 348, the protocol stack 308 or 324 may drop the data packet 338 or consider the data packet 338 as not received to address the problems with a lack of receive buffers for incoming data packets. When the transport protocol 316 or 332 adopts such a policy to handle the lack of receive buffers, transport protocol 316 or 332 may notify the protocols 312-314 and 328-330 respectively about the lack of receive buffers 321 or 337. Accordingly, the transport protocol 316 or 332 may assume that congestion is present on the connection and reduce the amount of bandwidth utilized to transport the data packets between the nodes 302 and 304. Then, the dropped data packets may be retransmitted because the transport protocol 316 may determine that the dropped data packets were not received. As such, the transport protocols 316 and 332 may be used to manage the flow control because they are able to recover dropped packets without terminating the connection between the nodes 302 and 304.

As a specific example, the first node 302 may send the data packet 338 to the second node 304. The data packet 338 may be received by the transport protocol 332. The transport protocol 332 may initiate a request 358 to the iWARP protocols 330. The request 358 may be a request to determine if buffers 337 are available for the data packet 338. The request 358 may be sent to the DDP protocol 210 or RDMA protocol 208 (FIG. 2), which are part of the iWARP protocols 330. The iWARP protocols 330 may respond to the transport protocol 332 with a response 360. The response 360 may indicate that the buffers 337 are available or unavailable. If the buffers 337 are available, then the transport protocol 332 may send an acknowledgement packet 348, as discussed above. However, if the buffers 337 are unavailable, the transport protocol 332 or RNIC 334 may drop the data packet 338. For notification about the lack of receive buffers 337, the iWARP protocols 330 may then generate an interrupt or message for the application protocol 326, the datamover protocol 328, and/or the second process 322. Accordingly, when another packet (e.g. another acknowledgement packet 348) is received by the first node 302, the acknowledgement field 354 will indicate that the data packet 338 was not received by the second node 304. Accordingly, the transfer protocol 316 will retransmit the data packet 338 according to the recovery mechanisms utilized by the transport protocols 316 and 332. This allows the connection between the nodes 302 and 304 to remain active despite the lack of receive buffers 337 at the second node 304.

By utilizing the transport protocols 316 and 332 to provide flow control, the communication between the nodes 302 and 304 may be maintained and more efficient. Also, the flow control mechanism may be transparent to existing TCP implementations and may not have any adverse effects on the existing networks because the flow control mechanism conforms with the existing standards. Accordingly, a system employing one or more of the disclosed embodiments may exchange data between the nodes 302 and 304 in a more efficient manner. The operation of the flow control mechanism is further explained in FIG. 4.

Figure 4:
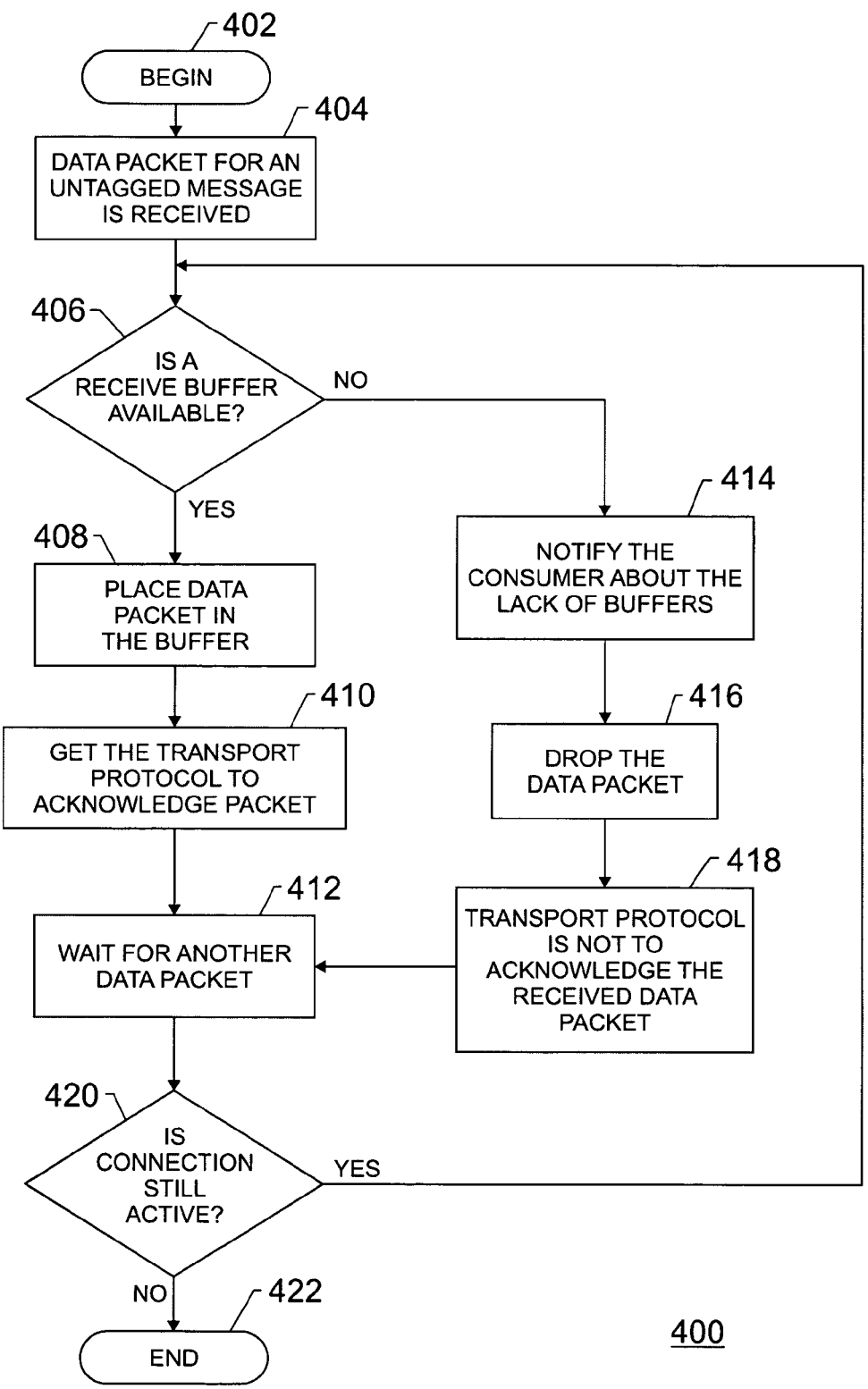
FIG. 4 is a process flow diagram illustrating a flow control mechanism in accordance with one embodiment of the present invention.

Turning to FIG. 4, a flow diagram is illustrated in accordance with embodiments of the present invention. In this diagram, generally referred to by the reference numeral 400, a flow-control mechanism may be implemented and may be utilized in the system, such as the exemplary computer network 100. The process begins at block 402. At block 404, a data packet for an untagged message is received by a destination node, such as the second node 304. The data packet may be received at the RNIC 334 or transport protocol 332 of the second protocol stack 324. The data packet, such as the data packet 338 (FIG. 3), may be an untagged message carrying an iSCSI immediate command, an asynchronous message, unsolicited data for write commands, and/or the like, which is not managed by the iSCSI flow control protocol. Once the data packet is received, a determination is made as to whether a receive buffer is available, as shown in block 406. The determination whether a receive buffer is available may be made by the RNIC 334 or within the protocol stack 324. As discussed above in FIG. 3, the transport protocol 332 may exchange the request 358 and the response 360 with the iWARP protocols 330 to determine if receive buffers 337 are available.

If receive buffers are available, the data packet may be handled through the normal process, as shown in blocks 408 through 412. At block 408, the data packet is placed in one of the receive buffers that is available. Then, the transport protocol, such as transport protocol 332 (FIG. 3), may acknowledge the data packet, as shown in block 410. The acknowledgement of the data packet results in an acknowledgement packet, such as acknowledgement packet 348 (FIG. 3), being transmitted to the node that sent the data packet. As noted above, this may include the incrementing of the acknowledgement field to notify the node that sent the data packet that the data packet has been received. After the acknowledgment is sent, the transport protocol 332 or RNIC 334 (FIG. 3) may wait for another data packet to be received in block 412.

However, if receive buffers are not available in block 406, then the flow control mechanism may be utilized, as shown in blocks 414 through 418. In block 414, the process, such as the second process 322, may be notified about the lack of receive buffers. The notification may include the generation of an interrupt or the generation of a message to one of the protocols in the protocol stack or the process. Then, as shown in block 416, the data packet, which may be the data packet 338, may be dropped. The data packet may be dropped by the transport protocol 332 on the RNIC 334 (FIG. 3). Once the data packet has been dropped, the transport protocol will not acknowledge that the data packet was received, as shown in block 418. Then, the RNIC or transport protocol may wait for another data packet in block 412, which is discussed above.

Once another data packet has been received, a determination may be made as to whether the connection between the nodes is still active, as shown in block 420. The determination whether the connection is active may be based on if the protocols indicate that the connection is terminated. If the connection is active, the determination as to whether receive buffers are available is made, as shown in block 406. However, if the connection is no longer active, then the process ends, as shown in block 422.

While the invention may be susceptible to various modifications and alternative forms, specific embodiments have been shown by way of example in the drawings and are described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus for managing flow control of a data transfer, comprising:
a processor adapted to operate according to a first protocol associated with a plurality of receive buffers, the processor being further adapted to operate according to a second protocol adapted to manage the plurality of receive buffers for the first protocol, the processor being further adapted to operate according to a third protocol that determines whether one of the plurality of receive buffers is available for a data packet and (a) if one of the plurality of receive buffers is available, permits an acknowledgement packet to be sent to a node that sent the data packet, and (b) if one of the plurality of receive buffers is unavailable, drops the data packet, notifies the second protocol regarding the unavailability of the plurality of receive buffers, and withholds the acknowledgement packet.

2. The apparatus set forth in claim 1, wherein the first protocol is an upper layer protocol ("ULP").

3. The apparatus set forth in claim 2, wherein the upper layer protocol is an internet small computer systems interface ("iSCSI") protocol.

4. The apparatus set forth in claim 1, wherein the second protocol is a datamover protocol.

5. The apparatus set forth in claim 1, wherein the third protocol is an iWARP protocol.

6. The apparatus set forth in claim 5, wherein the iWARP protocol is a direct data placement ("DDP") protocol.

7. The apparatus set forth in claim 1, comprising a transport protocol that generates a request to the third protocol to determine whether one of the plurality of receive buffers is available for the data packet.

8. The apparatus set forth in claim 1, wherein the data packet comprises a sequence field that corresponds to a reliability tracking value for the data packet.

9. The apparatus set forth in claim 1, wherein the acknowledgement packet comprises an acknowledgement field that corresponds to an identity of data received by the transport protocol.

10. The apparatus set forth in claim 1, comprising a transport protocol that uses a remote direct memory access network interface card ("RNIC") to receive the data packet and send the acknowledgement packet.

11. A network, comprising:
a plurality of systems, at least one of the plurality of systems executing a process; and
at least one input/output device adapted to receive a data packet from the at least one of the plurality of systems, the at least one input/output device comprising:
a first protocol associated with a plurality of receive buffers;
a second protocol adapted to manage the plurality of receive buffers for the first protocol; and
a third protocol that determines whether one of the plurality of receive buffers is available for a data packet and (a) if one of the plurality of receive buffers is available, permits an acknowledgement packet to be sent to a node that sent the data packet, and (b) if one of the plurality of receive buffers is unavailable, drops the data packet, notifies the second protocol regarding the unavailability of the plurality of receive buffers, and withholds the acknowledgement packet.

12. The network set forth in claim 11, wherein the first protocol is an upper layer protocol ("ULP").

13. The network set forth in claim 12, wherein the upper layer protocol is an internet small computer systems interface ("iSCSI") protocol.

14. The network set forth in claim 11, wherein the second protocol is a datamover protocol.

15. The network set forth in claim 11, wherein the third protocol is an iWARP protocol.

16. The network set forth in claim 15, wherein the iWARP protocol is a direct data placement ("DDP") protocol.

17. The network set forth in claim 11, comprising a transport protocol that generates a request to the third protocol to determine whether one of the plurality of receive buffers is available for the data packet.

18. The network set forth in claim 11, wherein the data packet comprises a sequence field that corresponds to a reliability tracking value for the data packet.

19. The network set forth in claim 11, wherein the acknowledgement packet comprises an acknowledgement field that corresponds to an identity of data received by the transport protocol.

20. The network set forth in claim 11, comprising a transport protocol that uses a remote direct memory access network interface card ("RNIC") to receive the data packet and send the acknowledgement packet.

21. A method of managing flow control of a data transfer, the method comprising the acts of:
receiving a data packet;
determining whether at least one receive buffer is available for the data packet;
if the at least one buffer is available, sending an acknowledgement packet to a node that sent the data packet; and
if the at least one buffer is unavailable, dropping the data packet, providing a notification regarding the unavailability of the at least one buffer, and withholding an acknowledgement packet from the node that sent the data packet.

22. The method set forth in claim 21, comprising the act of placing the data packet into the at least one buffer if the at least one buffer is available.

23. The method set forth in claim 21, comprising the act of transmitting the data packet according to a transmission control protocol ("TCP").

24. The method set forth in claim 21, comprising the act of providing the notification regarding the unavailability of the at least one buffer via an internet small computer systems interface ("iSCSI") protocol.

25. The method set forth in claim 21, comprising the act of notifying a process associated with the at least one buffer once the at least one buffer is determined to be unavailable.

26. An apparatus for managing flow control of a data transfer, comprising:

means for receiving a data packet at a first protocol;

means for determining whether at least one receive buffer is available for the data packet;

means for sending an acknowledgement packet to a node that send the data packet if the at least one buffer is available; and means for dropping the data packet, notifying a second protocol regarding the unavailability of the at least one buffer, and preventing an acknowledgement packet from being sent if the at least one buffer is unavailable.

\* \* \* \* \*